March 24, 1959 — A. I. PETROVICH — 2,879,375

METHOD OF WELDING CLAD METAL PLATES

Filed April 10, 1958

INVENTOR.
A.I. Petrovich.
BY
Attorney.

United States Patent Office 2,879,375
Patented Mar. 24, 1959

2,879,375

METHOD OF WELDING CLAD METAL PLATES

Anton I. Petrovich, Chester, Pa., assignor to Lukens Steel Company, Coatesville, Pa., a corporation of Pennsylvania Application April 10, 1958, Serial No. 727,641

3 Claims. (Cl. 219—137)

This invention relates to a novel method of welding clad metal plates, and more particularly to a method of welding certain kinds of clad metal plates using high hydrogen electrodes, providing the usual content of hydrogen, i. e. electrodes not classified as "low" hydrogen types, and then heating the weld so formed to drive out the hydrogen introduced into the weld during the welding operation.

The principal object of the invention is to produce a weld between two clad plates which will not crack when subjected to slow bending or equivalent types of deformation having tensile stressing conditions.

A further object of this invention is to form a crack and/or fissure resistant weld between two clad metal plates, the backing layer being carbon steel and the cladding layer being Hastelloy B.

Other objects will appear hereinafter throughout the specification.

Referring to the drawing.

Figure 1:
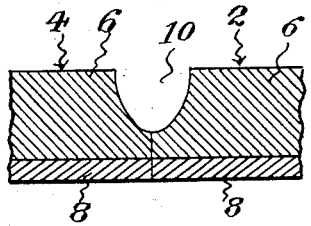
Figure 1 is a vertical section taken through meeting edge portions of two Hastelloy B clad plates when in position to be welded.
Figure 2:
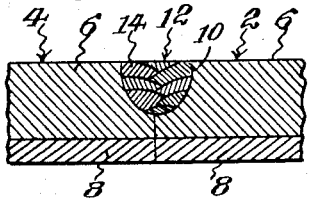
Figure 2 is a sectional view similar to Figure 1 but showing the weld which has been made in the backing layers of the clad plates.
Figure 3:
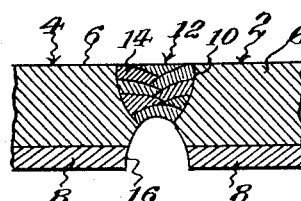
Figure 3 is a sectional view similar to Figure 2 but showing the welding groove formed to receive the weld on the clad side of the plates.
Figure 4:
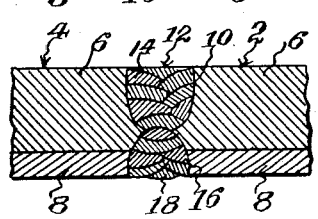
Figure 4 is a sectional view similar to Figures 1, 2 and 3 but showing the completed welds on both sides of the plates.

Referring now to the figures of the drawing, the plates to be welded are shown as represented by the reference characters 2 and 4, and each plate is made up of carbon steel backing layer 6 and a Hastelloy B layer 8 containing approximately 65% nickel, 28% molybdenum, and 6% iron. As clearly shown in Figure 1, the adjacent backing layers 6 are cut away to form more or less inclined portions which together form a welding groove 10 when the plates 2 and 4 are placed in edge to edge relation. It will be understood that all welding joint surfaces will be cleaned to present bright surfaces which should be thoroughly dried before the weld is made as is well known in the art. After the surfaces to be welded have been cleaned and dried, the weld 12 is formed by the use of one of the carbon steel welding electrodes known in the trade as AWS–ASTM E610, E611, E612, E613, E620, and E630. These electrodes consist of .06 to .14 percent carbon, .20 to .65% manganese, .15 to .45% silicon, .35 maximum percent phosphorus, .35 maximum percent sulphur, .55 maximum percent molybdenum, and the balance essentially iron. The different welding beads formed by the welding electrodes are indicated at 14 in Figures 2, 3, 4 and 5 in the drawing.

The welding groove 16 for the Hastelloy B layers 8 is formed by a grinding wheel or by machining, but if an abrasive wheel is used, care should be taken against prolonged grinding in any relatively short length of joint as to do so may raise the temperature in the welding zone to an undesirably high level. As clearly shown in Figures 4 and 5, the weld beads are indicated at 18. While these weld beads are formed for the most part by a Hastelloy B electrode, it has been found that stainless steel electrodes are most effective for use in forming the weld bead at the bottom of the groove 16, this weld bead being used as a barrier against undesirable pickup of iron from the backing layer. Depending on the size of the groove made by the grinding wheel or other means used to form the groove, electrodes of a diameter of four or five thirty-seconds of an inch are preferable for the initial and subsequent passes. The size of the electrode should be such as to permit a smooth flow of weld metal with no slag entrapment during the welding process. The speed of travel of the electrode for the root bead on the Hastelloy B side should be approximately seven inches per minute.

Figure 5:
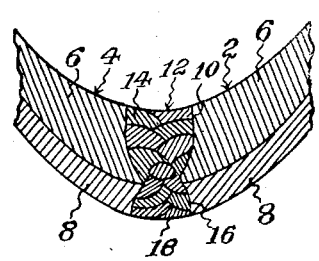
Figure 5 is a vertical sectional view through the welds and the adjacent portions of the plates showing how the welds resist cracking in a bend test.

After the welding operation is completed, the weld is subjected to a heat treatment for approximately four and a half hours at a temperature of approximately 212° F., or for forty-five minutes to approximately one hour at a temperature of approximately 400° F., or for approximately three hours at a temperature of approximately 300° F., to drive hydrogen out of the weld and thus render it more resistant to cracking when subjected to a bend test. I have found that when a weld made as described above, and with the type of electrodes indicated, is subjected to such a heat treatment, no cracking of the weld occurs during a bend test when tested at a rate of less than 16 inches per minute ram speed. Such a bend test is illustrated in Figure 5 of the drawing. However, if the heat treatment step is omitted, it has been found that the weld will crack when subjected to the same test.

The above description and drawings disclose a single embodiment of the invention, and specific language has been employed in describing the figures. It will, nevertheless, be understood that no limitations of the scope of the invention are thereby contemplated, and that various alterations and modifications may be made as would occur to one skilled in the art to which the invention relates.

I claim:

1. The method of welding together two clad metal plates, each of which has a backing layer of carbon steel and a cladding layer containing approximately 65% nickel, 28% molybdenum, and 6% iron, which comprises placing the plates in abutting edge to edge relation, the adjacent portions of said backing layers being inclined outwardly in opposite directions to form a weld groove in said portions of the backing layers, forming a high hydrogen steel weld in said groove, using coated high hydrogen electrodes containing .06 to .14% carbon, .20 to .65% manganese, .15 to .45% silicon, .35% maximum phosphorus, .35% maximum sulphur, .55% maximum molybdenum, and the balance essentially iron, forming a weld groove in the cladding layers at the abutting edges of the plates, depositing a stainless steel welding bead in the bottom of said second groove, using a plurality of covering beads for said stainless steel bead, and then heating the welded portions at a temperature of approximately 212° F. for approximately four and a half hours.

2. The method as defined in claim 1, wherein said covering beads are formed by a coated welding rod containing approximately 65% nickel, 28% molybdenum, and 6% iron.

3. The method of welding together two clad metal plates as defined in claim 1, wherein said electrode consists of .07 to .12% carbon, .30 to .50% manganese, .20 to .40% silicon, and the balance essentially iron.

References Cited in the file of this patent

UNITED STATES PATENTS

| | | |
|---|---|---|
| 1,812,123 | Stresau | June 30, 1931 |
| 1,990,628 | Andrus | Feb. 12, 1935 |
| 2,356,822 | Chyle | Aug. 29, 1944 |
| 2,416,379 | Cohn | Feb. 25, 1947 |
| 2,819,517 | Pursell | Jan. 14, 1958 |